US011655977B2

(12) United States Patent
Healey

(10) Patent No.: US 11,655,977 B2
(45) Date of Patent: May 23, 2023

(54) GAS POWERED TORCH

(71) Applicant: Robert W. Healey, Chouteau, OK (US)

(72) Inventor: Robert W. Healey, Chouteau, OK (US)

(*) Notice: Subject to any disclaimer, the term of this patent is extended or adjusted under 35 U.S.C. 154(b) by 365 days.

(21) Appl. No.: 16/665,087

(22) Filed: Oct. 28, 2019

(65) Prior Publication Data

US 2020/0132298 A1   Apr. 30, 2020

Related U.S. Application Data

(60) Provisional application No. 62/750,923, filed on Oct. 26, 2018.

(51) Int. Cl.
*F23D 14/38* (2006.01)
*F23D 14/46* (2006.01)
*F23Q 3/00* (2006.01)
*A47J 37/07* (2006.01)

(52) U.S. Cl.
CPC ........... *F23D 14/38* (2013.01); *F23D 14/465* (2013.01); *F23Q 3/008* (2013.01)

(58) Field of Classification Search
CPC ...... A47J 37/079; F23D 14/38; F23D 14/465; F23Q 3/008
See application file for complete search history.

(56) References Cited

U.S. PATENT DOCUMENTS

| | | | | |
|---|---|---|---|---|
| 524,449 A | * | 8/1894 | Muchall | F24C 3/106 431/191 |
| 1,179,255 A | * | 4/1916 | White | F24C 3/106 431/191 |
| 1,724,132 A | * | 8/1929 | Hegeman | F23D 11/001 431/23 |
| 2,121,948 A | * | 6/1938 | Borland | F23D 14/58 431/349 |
| 2,826,904 A | * | 3/1958 | Williamson | F23Q 2/48 431/276 |
| 2,986,208 A | * | 5/1961 | Aciego | F23Q 2/48 431/276 |
| 3,052,112 A | * | 9/1962 | Wheeler | B23K 5/22 431/276 |

(Continued)

FOREIGN PATENT DOCUMENTS

| | | | | |
|---|---|---|---|---|
| DE | 2916875 A1 | * | 11/1980 | F23D 14/38 |
| DE | 29622544 U1 | * | 3/1997 | F23D 14/46 |

(Continued)

*Primary Examiner* — Michael G Hoang
*Assistant Examiner* — Logan P Jones
(74) *Attorney, Agent, or Firm* — Fellers, Snider, Blankenship, Bailey & Tippers, P.C.; Terry L. Watt

(57) ABSTRACT

Various embodiments utilize a novel approach to igniting the natural gas flame that is emitted from the end of the torch. According to one embodiment a rotary diverter within the ignition bell of the GrillGun is used to shunt a portion of the higher velocity gas flow to an area in the bell where the ignition spark is out of the direct burning gas stream. According to another embodiment the ignition bell has a plate that largely covers its open end that reduces the length of the flame that is emitted and focuses it. Still another embodiment has a check valve that operates to stop the flow of gas to the gas conduit when the GrillGun is dropped or tipped over or liquid propane is otherwise presented into the check valve by any other means.

9 Claims, 6 Drawing Sheets

(56) References Cited

U.S. PATENT DOCUMENTS

| | | | | |
|---|---|---|---|---|
| 3,275,060 A | * | 9/1966 | Lindgren | F23D 14/38 431/276 |
| 3,635,646 A | * | 1/1972 | Cox | F23D 14/36 431/89 |
| 4,181,492 A | * | 1/1980 | Zinke | F23Q 3/002 310/339 |
| 4,276,017 A | * | 6/1981 | Julien | F23D 14/38 126/271.2 R |
| 4,361,420 A | * | 11/1982 | Bell | A62C 4/00 431/346 |
| 4,776,786 A | * | 10/1988 | Huber | F24C 3/106 356/315 |
| 5,186,620 A | * | 2/1993 | Hollingshead | F23D 14/045 239/558 |
| 5,433,602 A | * | 7/1995 | Sigler | F23D 14/08 29/890.02 |
| 2017/0089576 A1 | * | 3/2017 | Morehead | F23Q 1/02 |

FOREIGN PATENT DOCUMENTS

| | | | | | |
|---|---|---|---|---|---|
| FR | 2319851 A1 | * | 2/1977 | | F23Q 7/24 |
| GB | 481684 A | * | 3/1938 | | F24C 3/106 |
| GB | 1028214 A | * | 5/1966 | | F24C 3/106 |
| GB | 1553191 A | * | 9/1979 | | F23D 14/28 |

* cited by examiner

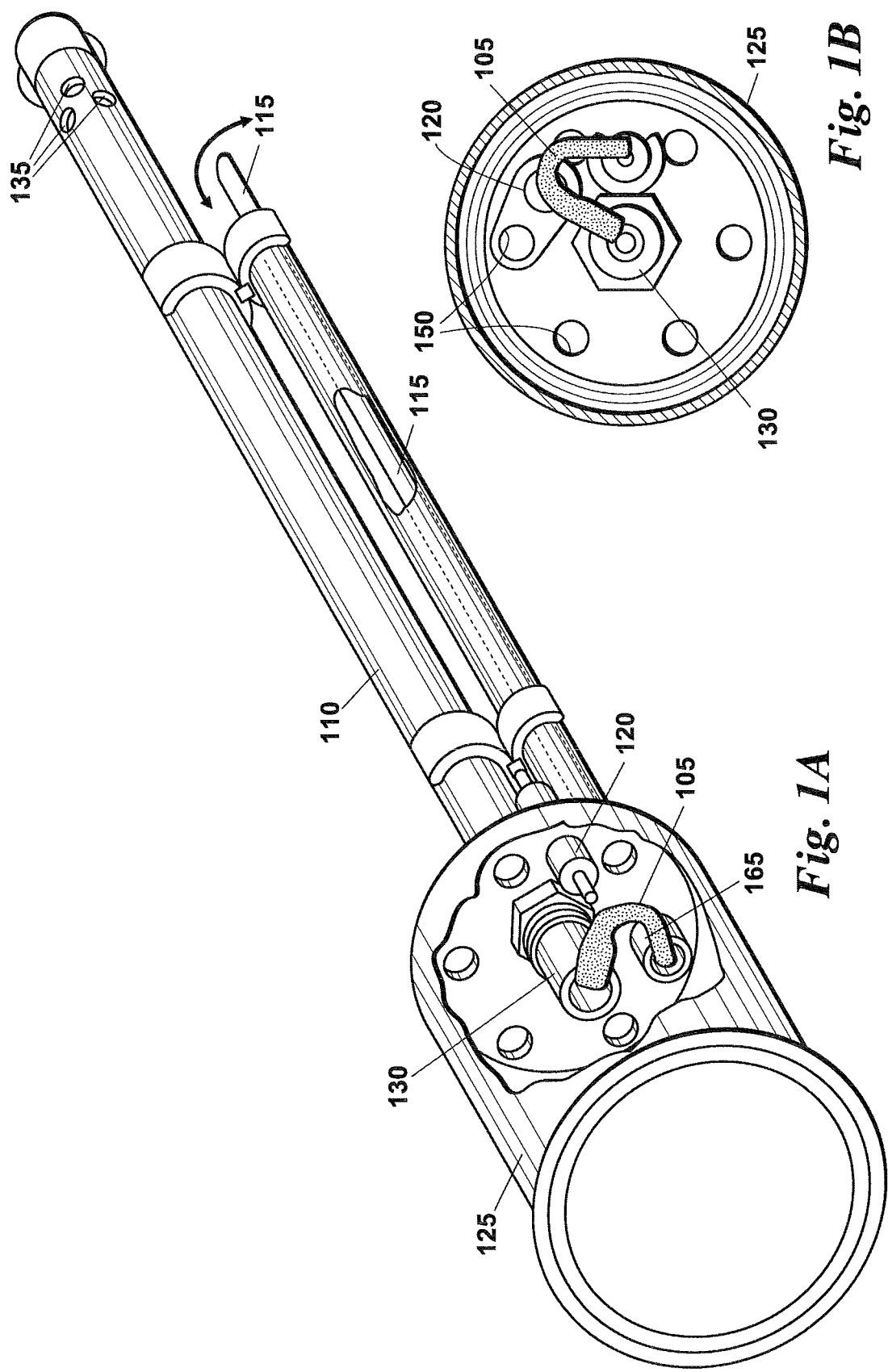

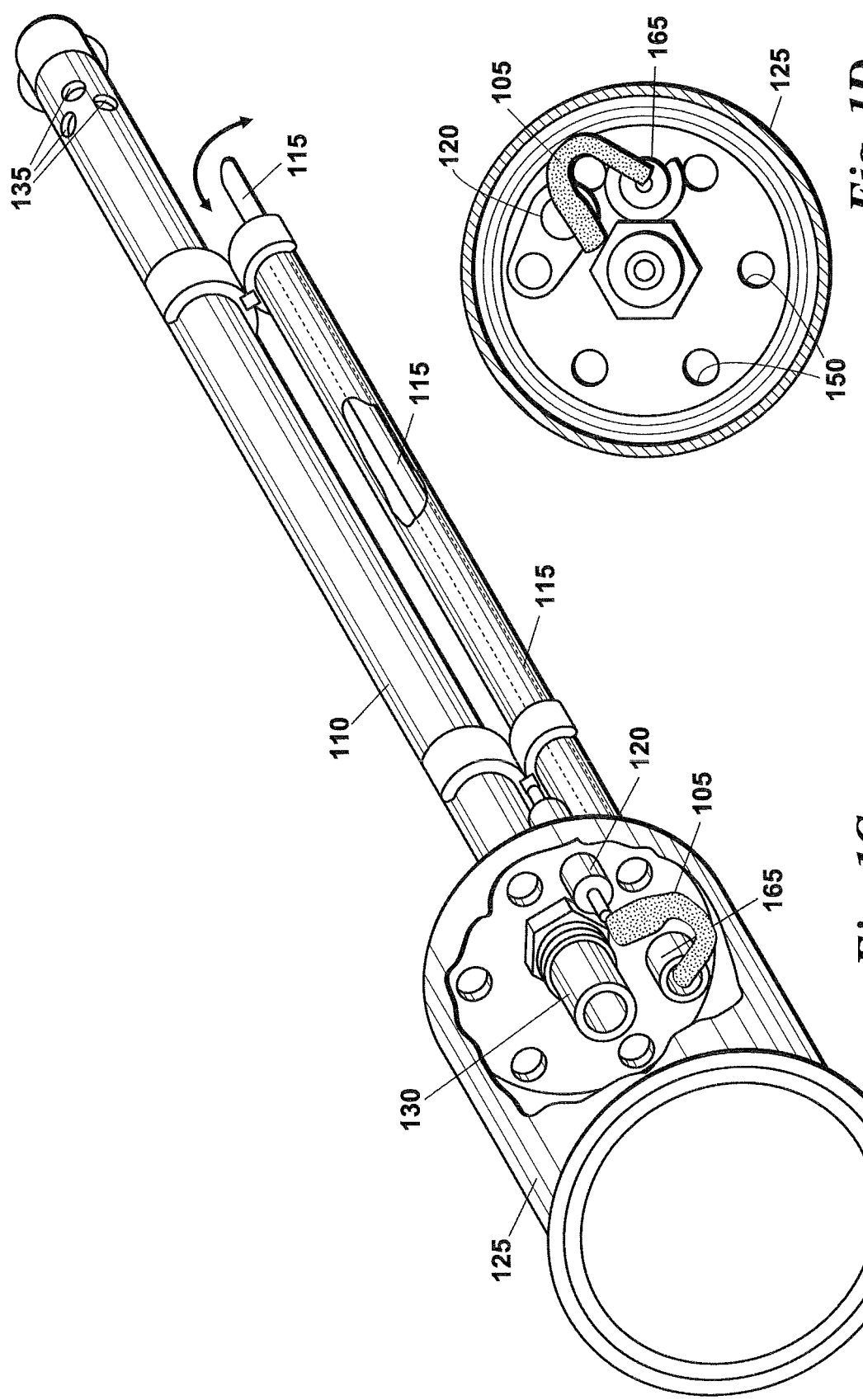

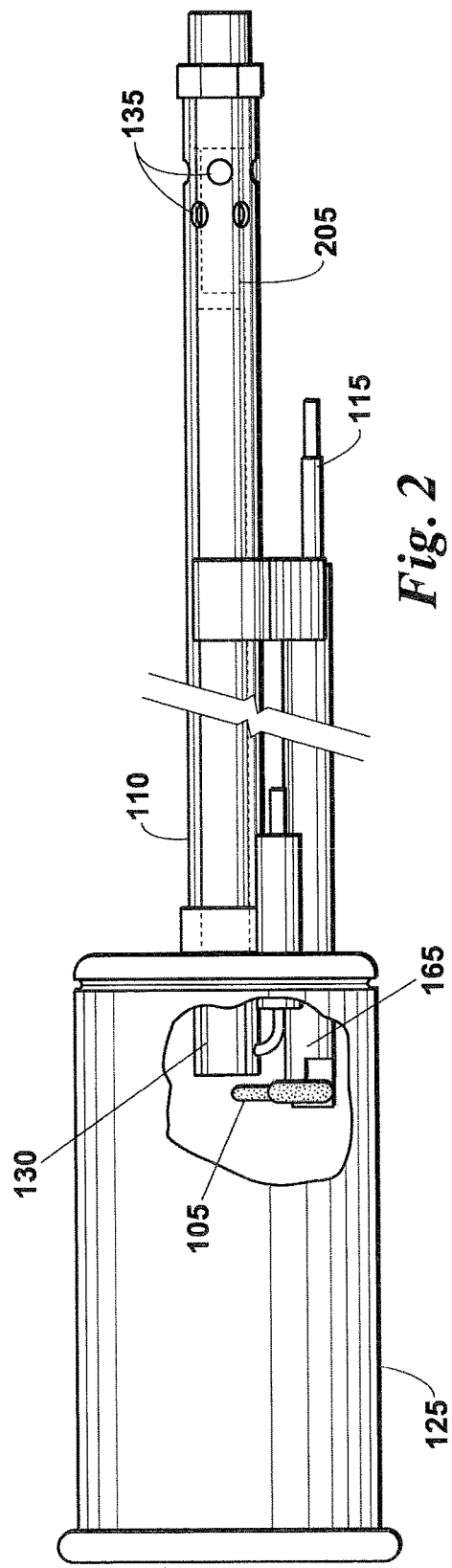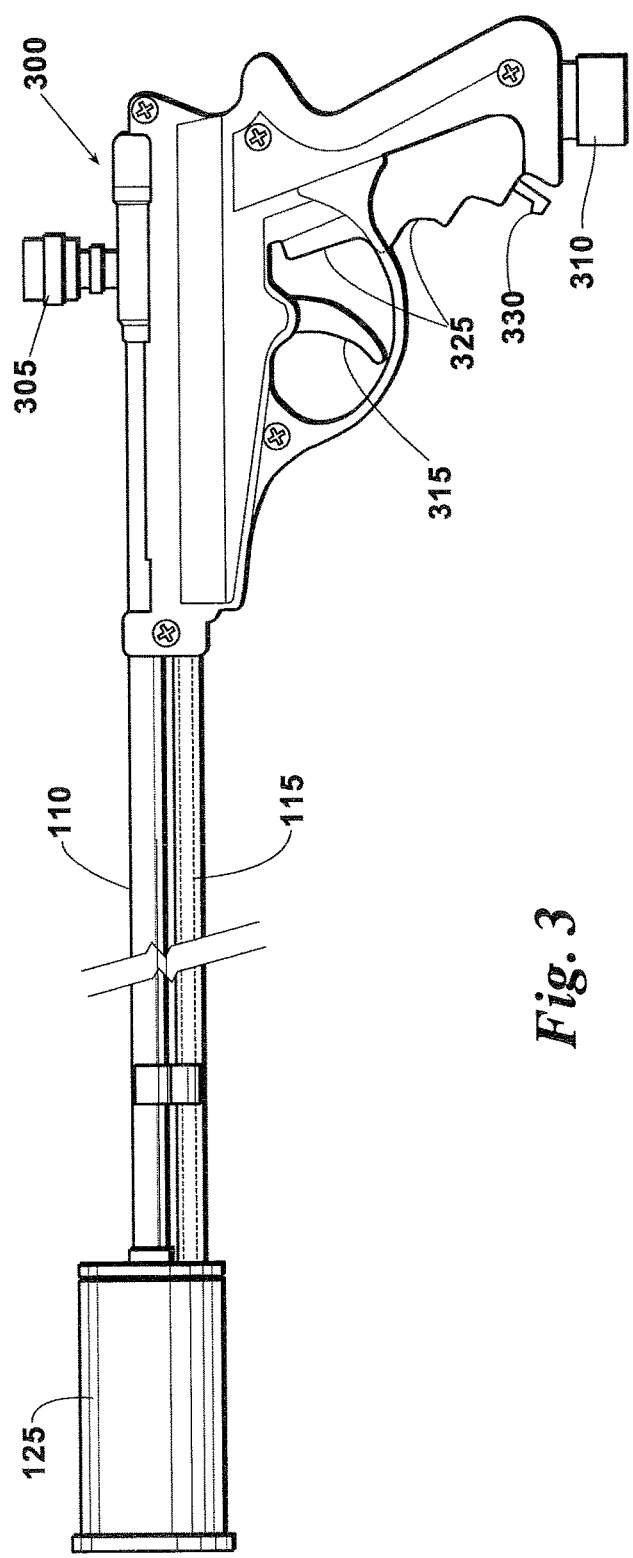

GAS POWERED TORCH

CROSS REFERENCE TO RELATED APPLICATIONS

This application claims the benefit of U.S. Provisional Patent Application Ser. No. 62/750,923 filed on Oct. 26, 2018, and incorporates said provisional application by reference into this document as if fully set out at this point.

TECHNICAL FIELD

This disclosure relates generally to outdoor grilling and, more specifically, to systems and methods for igniting charcoal or wood, for the purpose of grilling, or lighting barbecue smokers.

BACKGROUND

Outdoor grilling is one of America's favorite warm weather pastimes, and gas grills out-sell charcoal grills by 1 and a half to one. That is to say that 60% of grills sold in the US are gas grills, instead of charcoal grills, principally because gas grills are quicker to use. When people are deciding on what kind of grill they want to purchase, a big factor in the decision is based on experience in how long it takes to start a charcoal grill.

To light a gas grill, typically a knob is turned to start the flow of gas to some burners which are then ignited with either a flame or an electric starter. Then the user will need to sit back and wait for the grill to come up to temperature which might take 10 minutes or so. If the source of heat is charcoal, approaches such as charcoal chimneys, matchlight charcoal briquets, and lighter fluid have been used and are far and away the most common methods of lighting a charcoal grill. Other methods include fire starter sticks or blocks, alcohol laden fuel blocks, or a number of electric heating elements and blowers that make up the bulk of the other options.

All these methods can require a great deal of time (e.g., 20 to 30 minutes) before the grill is up to temperature and food can be placed on it. Furthermore, when lighter fluid or fluid soaked, self-igniting charcoal is used the residual flavors and odors can result in permeating the food that is cooked on the grill. Also, similar problems are observed when lighting wood smokers, where the fire box is off to the side and a fire must be built in it before the smoke can be drawn through the food chamber where the food is cooked by heat and exposure to smoke. Lighting smokers comes with the same challenges as charcoal grills.

Thus, what is needed is a better way of lighting charcoal and other fire sources which does not suffer from the disadvantages of the prior art.

Before proceeding to a description of the present invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

The GrillBlazer™ GrillGun™ was developed to solve the problem of lighting a grill or device which uses combustible products as fuel. It makes better use of charcoal as compared with gas because various embodiments of the instant invention allow a grill to be started quickly and easily. Using a GrillGun a charcoal grill can be started and cooking over charcoal with the aromatic experience begun, with the taste and widely touted health benefits associated with cooking over natural wood, more quickly than would be the case if you were cooking on a gas grill.

GrillGuns are high BTU output, clean burning torches. They are new, unique, and exciting to see and very fun to use. Ultimately, the instant inventor has contemplated a whole product line of GrillBlazer torches.

Further, various embodiments utilize a novel approach to igniting the propane gas flame that is emitted from the end of the torch. In brief, according to one embodiment a rotary diverter within the bell of the GrillGun is used to shunt a portion of the higher velocity gas flow to an area in the bell where the ignition spark is out of the direct burning gas stream. This makes it possible to reliably ignite the torch even in the presence of a very high velocity gas flow.

According to another embodiment, the bell on emitting end of the GrillGun has a special structure which tends to reduce the length of the flame that is emitted and focus it. In more particular, in this variation the bell of the GrillGun is designed to create a "foldback" effect inside of the bell by adding a plate with a small diameter exit hole to the end of the bell. Fuel, typically propane, that hits the plate outside of the hole is forced back toward the gas emitter on the other end of the bell, typically along the outer wall of the bell. That is, fuel is returned toward its source on the periphery of the fuel/air stream because it is deflected off of the plate around the hole. This results in the fuel-enriched air to fold back into the fuel stream at a lower velocity. This effect tends to create an eddy pool of fuel and air which does not exit the bell, therefore sustaining the burn. It slows down the velocity of the fuel passing through the bell enough to sustain a burn, and creates turbulence within the bell, all of which in turn tends to ignite high velocity fuel in the center of the fuel flow, thereby allowing the fuel to continue burning as it exits through the hole.

According to still another variation there is provided a check valve which is designed to shut off/or dramatically limit the flow of gas to the torch if, among others, the gas supply is not in a roughly vertical position. In one variation the check valve takes the form of a steel ball within a chamber which contains an exit hole smaller than that of the steel ball. The check valve is installed between the fuel source, typically a container of propane, and the conduit that takes the fuel to the torch.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

FIGS. 1A-1D different views of an embodiment of the invention. FIG. 1A contains a perspective view and end view of an embodiment wherein the diverter 105 is rotated into the fuel stream, thereby redirecting some of the gas flow toward the spark electrode 120. FIG. 1B contains a schematic illustration of an end view of FIG. 1A. FIG. 1C contains an example of a configuration where the diverter 105 has been rotated out of the fuel stream, thereby disabling the spark igniter 120 and removing both the diverter and the electrode from the fuel stream. FIG. 1D contains a schematic illustration of an end view of the embodiment of FIG. 1C.

FIG. 2 illustrates a cut away view of the embodiment FIG. 1, wherein a lean high velocity air and fuel flow is created through the use of air intake inlets 150 proximate to the gas nozzle 130 so that the high-pressure gas that is delivered to the bell at the end of the device pulls ambient air into the delivery tube via the air intake inlets, thereby mixing air with the fuel stream.

FIG. 3 contains a side view of an embodiment.

DETAILED DESCRIPTION

Figure 4:
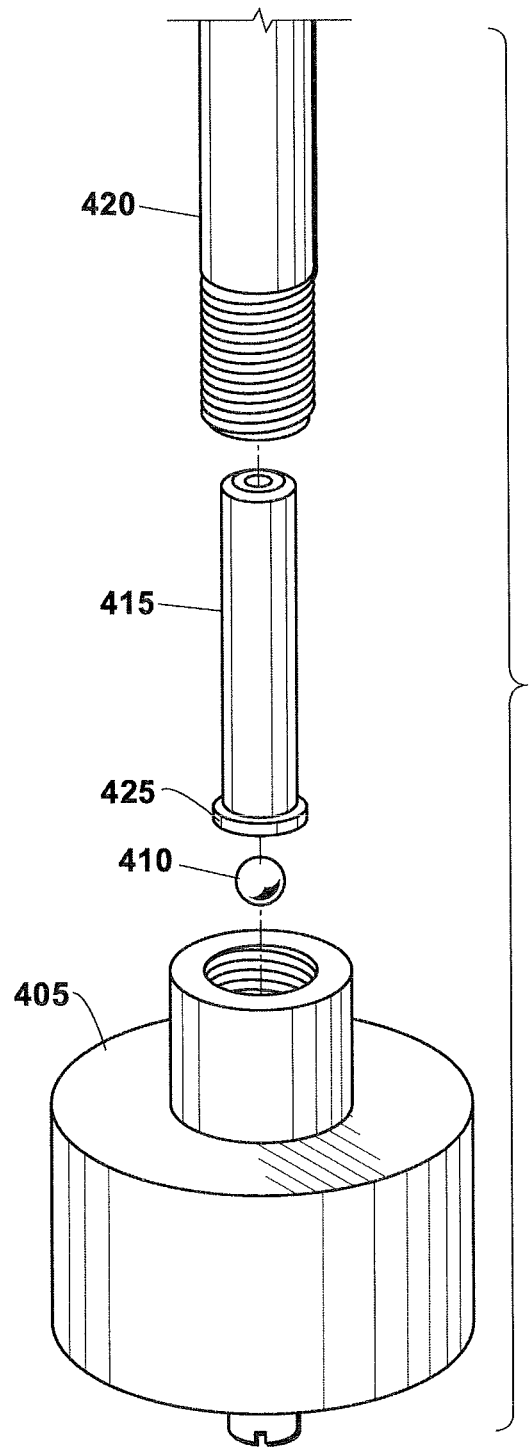
FIG. 4 contains an exploded view of a check valve embodiment.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

General Overview

The GrillGun 300 dramatically changes the game when it comes to lighting a charcoal grill or wood smoker. The GrillGun 300 can be used to light the charcoal (or wood), warm up the grill, burn off the residual grease, dirt or grime left on the grill after the last time it was cooked on, all in a matter of a couple of minutes rather than the typical 20 to 30 minutes it takes to bring a typical grill up to the temperature needed to cook food. Once you have a GrillGun 300, you too will take your food directly from the kitchen, walk out to your cold grill, put down your food, set the charcoal in place, light your grill and then place the food on the grill to cook right then.

While the creation of the GrillGun 300 was and is expressly designed to enable charcoal-grill enthusiasts to be able to enjoy the instant satisfaction of lighting their charcoal, heating-up their grill and sterilizing the grilling surface where they will be placing their food, in mere minutes rather than increments of half an hour, the tool is very clearly a powerful torch that can be used for other responsible purposes. Starting outdoor chimineas, fireplaces, smokers, campfires, picnic grills, freestanding stoves, outdoor incinerators, controlled pasture burns, weed burning, ice melting are all well within the multitude of uses for the GrillGun.

Various embodiments of the GrillGun 300 are designed to be ergonomically comfortable to use and very effective in the close quarters of lighting a charcoal grill. The gas connector 310 to the GrillGun is designed to either directly screw, for example, on a small portable one-pound propane bottle, or screw in an 8 foot hose that tethers to a larger 20 or 30 pound propane tank. Clearly the cost of fuel is more economical when the larger propane tanks are used, but the instant invention can be used when the portability of a small tank is desired or when extensive and continuous burning needs are not needed. Likewise, the GrillGun 300 burns through fuel relatively quickly, which will consume a small 1 pound propane bottle in about 6 total minutes of run-time, so if the user is a frequent charcoal griller, a 20 pound propane tank situated proximate to the grill can be used, which rarely needs to be refilled.

Although the GrillGun 300 is designed to screw right onto a 1 pound propane bottle, via connector 310 there is an inherent drawback to using these small tanks, and it has something to do with physics. The problem has to do with the effects of expanding propane, not the GrillGun 300, but it is noted here since it can potentially affect the GrillGun's 300 performance in some embodiments. The biggest drawback to using the small 1 pound bottles comes with the fact that as liquid propane expands and turns to gas as it comes out of the bottle through the torch, the gas expansion inside the propane bottle causes the propane in the bottle to cool down and get quite cold. In fact, the bottle can start freezing up and frost building on the outside after prolonged usage of the GrillGun 300.

As a specific example, as the propane chills it loses its ability to evaporate which causes the velocity of the escaping gas to be significantly reduced. So, in practice, if the propane bottle is full and is at room temperature when the flame is activated, about 2 minutes will pass before the output volume of gas is significantly reduced. So, if the grill can be lighted in under 2 minutes, the user will notice the bottle getting quite cold but there will not be any reduction in fuel flow. Once the torch is turned off and the fuel stops flowing, the bottle will warm up and the process will repeat the next time it starts from room temperature again.

The same thing happens in the 20 pound or 30 pound bottles, but there is so much more mass to cool down, that the user will likely never notice any degradation of torch output, until the tank is nearly completely empty. Then the tank can simply be refilled. An additional benefit to the larger tanks is that the cost of a 1 pound bottle is quite a bit more expensive per pound than 20 pound propane bottle, therefore economics argue for the use of a 20 pound bottle to power the GrillGun 300 when grilling, smoking or barbecuing. So, use the 1 pound bottles regularly when portability is desired, or when the use of the GrillGun 300 is so infrequently that the fuel cost of operation is negligible.

Unlike other high capacity (400,000 to 500,00 BTU) weed torches, the GrillGun 300 tends to be miserly in terms of fuel consumption which is accomplished by leaning out the fuel mixture and premixing it before it gets to the Fire Bell 125. Compared to some weed torches, the GrillGun 300 will tend to use ¼th the fuel in the same amount of time, which is why it can be used effectively with small portable bottles.

Another design element of the GrillGun 300 is its fuel ignition system. The spark igniter inside the GrillGun 300 is rated for 28,000 sparks and the ignition spark electrode 120 and fuel diverter 105 is designed to never wear out, because it is stainless steel and not situated in the fuel flow which causes most other torches to have their self-igniters burn up within a few weeks.

Operating Instructions for a particular embodiment: Operate the GrillGun 300 in a clear open-air area where it will be safe to operate a high temperature torch without burning down structures that you don't intend to burn.

Note the components of the GrillGun before trying to operate it.

Fire Bell 125—The big bell on the end of the barrel where the fire will come out.

Gas valve 305—The brass valve with the red knob on top, the purpose of the gas valve is to regulate the flow of fuel through the torch.

Hook Ring—The metal ring at the back and top of the torch to hang it from a hook on your barbecue grill (hook not included).

Finger Trigger 315—The gun trigger (igniter switch) that you would pull with your index finger.

Handle Trigger 325—The squeeze handle below the trigger that you can pull with your other fingers.

Handle Trigger Lock 330—Safety release tab at the bottom of the handle that you depress in order to unlock the handle trigger, so it can be squeezed for pulsated fuel flow.

Turn the gas valve 305 (knob on top of the GrillGun) fully clockwise (to the right) to shut off the "constant flow" valve when connected to a fuel source. NOTE: Fuel will still flow through the gun even if the gas valve is turned off, if the Handle Trigger is being squeezed.

Hold the GrillGun 300 so that you are not depressing the Handle Trigger lock or squeezing the Handle Trigger Connect, for example, either a 1 pound propane fuel bottle or the 8 foot hose to a free-standing propane tank If you are connected through the 8' hose to the tank, then turn on the tank's propane fuel valve at this time. (Be sure you are not squeezing the Handle Trigger)

Barely turn on the GrillGun's fuel valve (rotate counter-clockwise, to the left) 305. The flame may not light when you pull the trigger 315, if you have the gas flow too high, so if the torch won't light, turn down the gas flow rather than turning it up.

Pull and release the Finger Trigger 315 to ignite the fuel flow. The GrillGun 300 should light and there should now be a small flame coming out of the Fire Bell.

Now you can adjust the gas valve to provide a higher flow of fuel or you can leave it set to a low flow of fuel and use the Handle Trigger to give you a burst of high velocity flame.

Depress the "Handle Trigger Lock" 330 with your "pinky" finger to release the Handle Trigger 325 and squeeze it to provide the desired intensity of flame. Note: Gas valve turned all the way up, is the same fuel flow as the Handle Trigger fully squeezed.

Exercise caution and safety use the GrillGun to light your desired fire.

Unique design considerations.

Rotable Gas Diverter: Pressing the Finger Trigger 315 acts to rotate a gas diverter 105 into a position where it shunts a portion of the higher velocity gas flow, to an area where the ignition spark is out of the burning gas stream. Releasing the trigger 315 allows the (preferably) spring loaded trigger 315 to return to a neutral position and results in the diverter 105 being rotated back to a position where it will not engage the gas flow (FIGS. 1C and 1D).

The unique design incorporates a rotating gas diverter 105 in the fire bell. When the Finger Trigger 315 is pulled, a mechanism inside the torch handle rotates the diverter 105 into the air-fuel mixture, where it re-directs a small amount of the gas flow towards the spark electrode 120 where it can be easily ignited with low gas flow. (FIGS. 1A and 1B). The spark ignites the gas without being in the flame so that the electrode 120 is never exposed directly to the flame so that it will never burn up. When the Finger Trigger 315 is released the diverter 105 rotates back out of the fuel flow stream, so it doesn't remain in the fire or obscure the high velocity fuel and air flow mixture. (FIGS. 1A and 1B).

Pre-mixed high velocity fuel flow (FIG. 2): The fuel and air are mixed in the gun barrel prior to entering the fire bell, which provides an extraordinarily clean burning, high velocity blue flame that consumes all the fuel creating the highest possible heat output for fuel input. This allows the torch to maximize the number BTUs of heat it can generate with the fuel provided.

The high velocity flow of fuel exiting the gas nozzle 130, draws air into the barrel which mixes with the fuel in the barrel prior to entering the fire bell.

This oxygen enriched fuel flow is too lean and too high a velocity of flow to be able to easily ignite in the end of the fire bell 125 without the fuel diverter 105 ignition system.

The resultant fuel mixture is so lean that if the burning fuel stream were not restrained by the fire bell cavity and air mixture process, the flame would blow off the end of the GrillGun and it could not sustain a flame.

Fuel Options for one embodiment: 1 lb propane bottles vs. 8 ft hose connected to a 20 or 30 lb propane bottle.

The small propane bottles (Coleman®, BernzOmatic®, etc.) 4" diameter or 3" diameter propane bottles make for great portability but have their drawbacks; likewise, a 20 lb bottle is heavy and not as convenient to use when you only need the torch for small jobs or when portability is important. You can also use MAP gas if you want, but it is significantly more expensive and there is no benefit to this torch for using it.

Various Embodiments in Greater Detail

Turning now to the figures, FIG. 3 contains an embodiment of the instant torch 300 that is suitable for use in many applications. As can be seen, the torch 300 is generally configured with a gas valve 305 that can be used to shut off the gas supply that enters the torch 300 via connector 310. Gas from the connector 310 travels to the bell 125 via conduit 110. In some embodiments the connector 310 might comprise a hose that has a fitting at each end, one of which mates with the 310 connector and the other that is matched to the source of gas. This particular arrangement might be most useful if a larger (e.g., 20 pound) source of gas is utilized.

Additionally provided is trigger 315 which is designed to rotate a diverter 105 (discussed below) into position via connecting rod 115 (also discussed below). In some embodiments, gas will continue to flow through the conduit 110 even if the gas value 305 is in the "off" position if the trigger 315 is pressed. Note that although the handle of the instant torch is styled in this embodiment to appear to be a gun, its appearance is unrelated to the functionality provided by this embodiment. For example, although a trigger-like mechanism has been provided as a way to allow the user to rotate the diverter 105 into position, those of ordinary skill in the art will recognize that there are many other ways to do this. What is important is that the diverter 105 should be movable into the path of gas that is being emitted under pressure from the nozzle 130 during the time when the gas is being ignited and then movable away from the gas path after the gas has been ignited.

FIG. 1C contains a detailed view of various components of an embodiment. The gas conduit 110 terminates inside of the bell 125 in nozzle 130. Diverter 105 is designed to be moved out of the way of the nozzle 130 except when the trigger 315 is pressed. That is, in this variation pressing the trigger 315 rotates rod 115 which terminates in post 165. The diverter 105 is supported by post 165 so when the trigger is pressed that rotates the diverter 105 into the path of the gas that is emitted from the nozzle 130 as is illustrated in FIG. 1A. The purpose of this arrangement will be discussed below. Additionally, an igniter electrode 120 situated within the bell 125 is activated when the diverter 105 is rotated into position by the trigger 315. Air intake orifices 150 are preferably provided in the base of the bell 125 to aid in the ignition and burning of the stream of gas that is emitted by the gas nozzle 130 during normal operation.

FIGS. 1B and 1D provide additional details of how this embodiment would operate in practice. When the trigger 315 is not pressed, the diverter 105 is rotated away from the terminus of the nozzle 130 so that gas can be freely emitted from its terminus. On the other hand when the trigger 315 is pressed, in this embodiment that action is used to rotate the diverter 105 into a position that blocks, but does not stop, the flow of gas from out of the nozzle 130. The purpose of the rotary diverter 105 is to shunt a portion of the higher velocity gas flow to an area in the bell 125 where the spark from the spark generator/electrode 120 is out of the path of the direct burning gas stream. In various embodiments the ignitor that initiates the electrode spark 120 might be a piezo ignitor, a battery powered ignitor, a pilot light, etc. In one present embodiment, the ignitor is a piezoelectric block that is struck when the trigger 315 is pulled so that it generates a high voltage spark while the gas is flowing and the diverter 105 is in place partially blocking the flow of gas. In this specific version the ignitor incorporates a steel bar attached to a spring assembly that is configured to compressed when the trigger 315 is pulled. The spring assembly has a breakover point which, when it is exceeded, operates to release the spring so that the steel bar is powered toward and strikes the piezoelectric block, thereby generating a spark at the electrode 120 that ignites the gas.

The use of the diverter 105 makes it possible to reliably ignite the torch 300 even in the presence of a very high velocity gas flow. In other words, the diverter 105 shunts some portion of the gas flow away from the source to create an eddy pool near the electrode 120. The turbulence and diversion created by the diverter 105 when it is in position creates regions of lower gas flow velocity which can be ignited more reliably that an igniter that is positioned to ignite the direct flow of gas from the nozzle 130.

FIG. 2 contains additional details of an embodiment. As can be seen in this cut-away view, in some embodiments within the conduit 110 will be a secondary gas nozzle 205. It will preferably be accompanied by some number of air intake ports 135 which are positioned away from the terminus of the secondary nozzle 205 and closer to the point at which gas enters the conduit 110. Those of ordinary skill in the art will readily understand why this configuration was chosen, i.e., it allows air to be drawn into the conduit 110 by the flow of gas that is emitted from the secondary nozzle 205, thereby providing some mixing of the stream of gas with air before it reaches the bell 125 which will tend to bring air into the system as soon as possible to lean the fuel out making it burn more completely once it is ignited in the bell 125.

Figure 5:
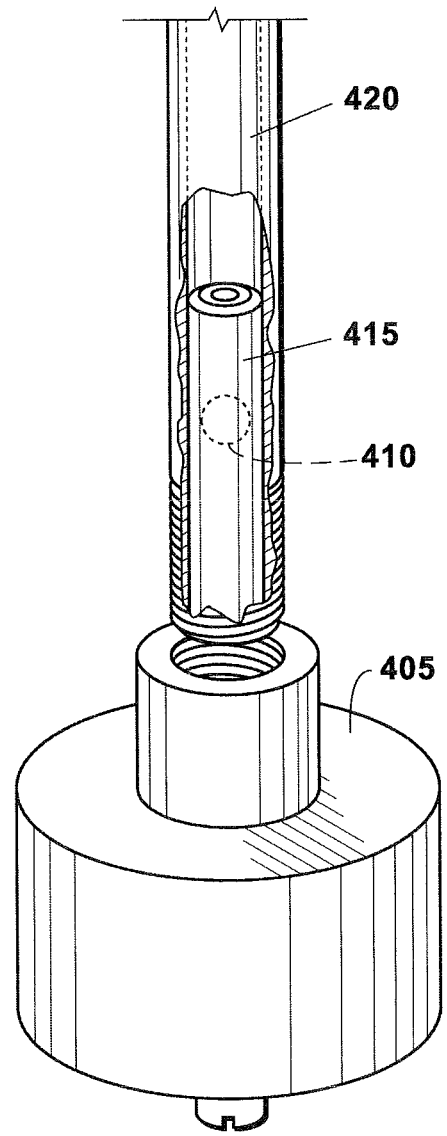
FIG. 5 contains a cut-away view of the embodiment of FIG. 4.

Turning next to FIGS. 4 and 5, there is provided an embodiment that has check valve assembly that will operate to terminate flow of gas if, as an example, the torch 300 is dropped or tips over while flame is being emitted from the bell 125. In other instances, the check valve assembly will operate to terminate the flow if liquid propane is present within it. FIG. 4 contains an expanded view of the assembly of FIG. 5. In some variations, this safety device will be positioned between the connector 310 and the gas valve 305 on the torch 300 so that the handle tube 420 is situated within the hand grip portion of the torch 300. As can be seen, in this embodiment the check valve assembly is intended to mate with a gas source via the gas connector 405. The check valve assembly comprises at minimum a check valve ball 410 and a check valve tube 415 that are intended to fit within the gas flow path between the connector 405 and the conduit 110. Additionally, a check valve tube flange 425 forms part of the lower end of the tube 415.

Situated within the handle tube 420 is a smaller check valve tube 415 that contains a check valve ball 410. The terminus at the upper end of the check valve tube 415 contains an aperture that is smaller than the diameter of the check valve ball 410 and the check valve ball 410 is of a weight sufficient to keep the flow of gas from pushing it against the upper end of the check valve tube 415 when the tube is approximately vertical. Additionally, the check valve tube 415 terminates on its lower end with a flange 425 which has a diameter larger than the handle tube 420 which prevents the check value assembly from traveling up the handle tube 420 and forces gas from the source to exclusively flow through the check valve tube 415 on its way to the valve 305.

FIG. 4 contains one possible configuration of the check valve ball 410 when gas is flowing. However, if the torch 300 is dropped, tips over, etc., the check valve tube 415 will be inclined away from vertical or even inverted which will make movement of the check valve ball 410 to the upper end of the check valve tube 415 possible. When the check valve ball 410 reaches the upper end of the check valve tube 415 it will block the flow of gas and stop the flow of gas through the torch 300. In some embodiments, the check value coupling 405 will be the same element as the connector 310 and the handle tube 420 will run within the handle of the embodiment 300

Figure 6:
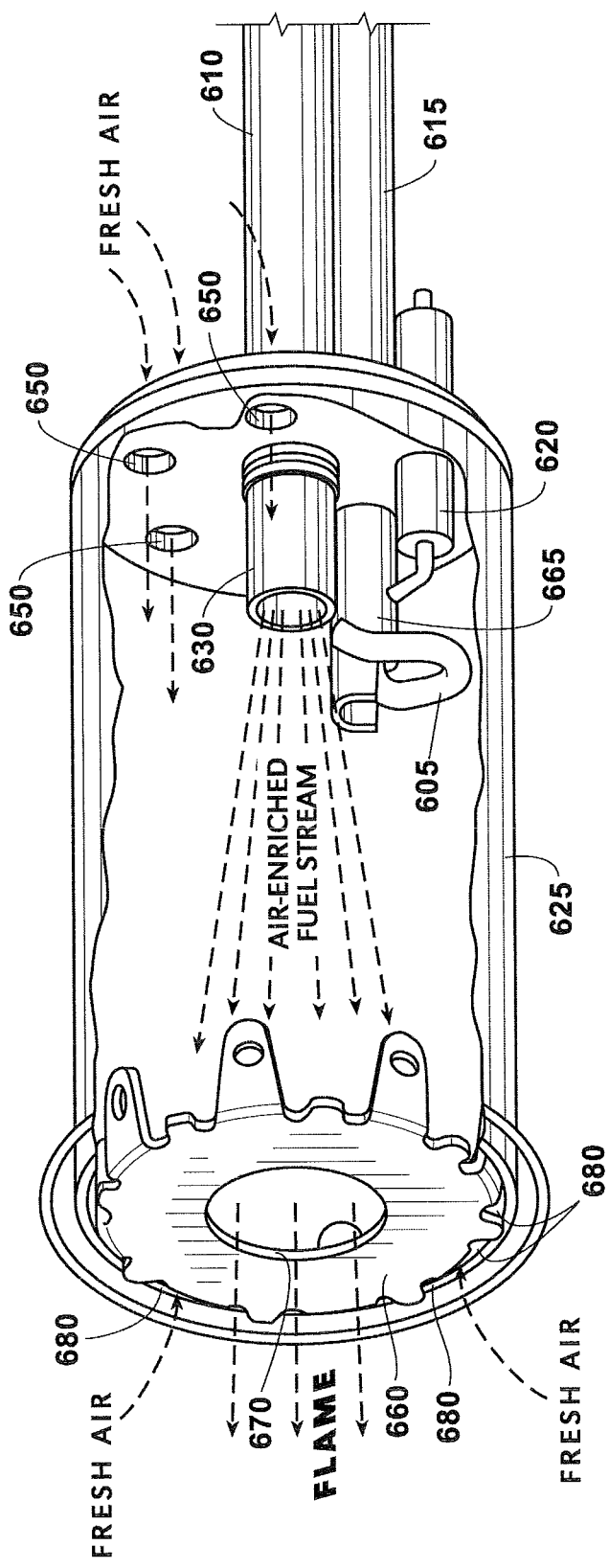
FIG. 6 contains a cut-away view of the operation of a fire bell which illustrates a fire bell reducer suitable for use with an embodiment.
Figure 7:
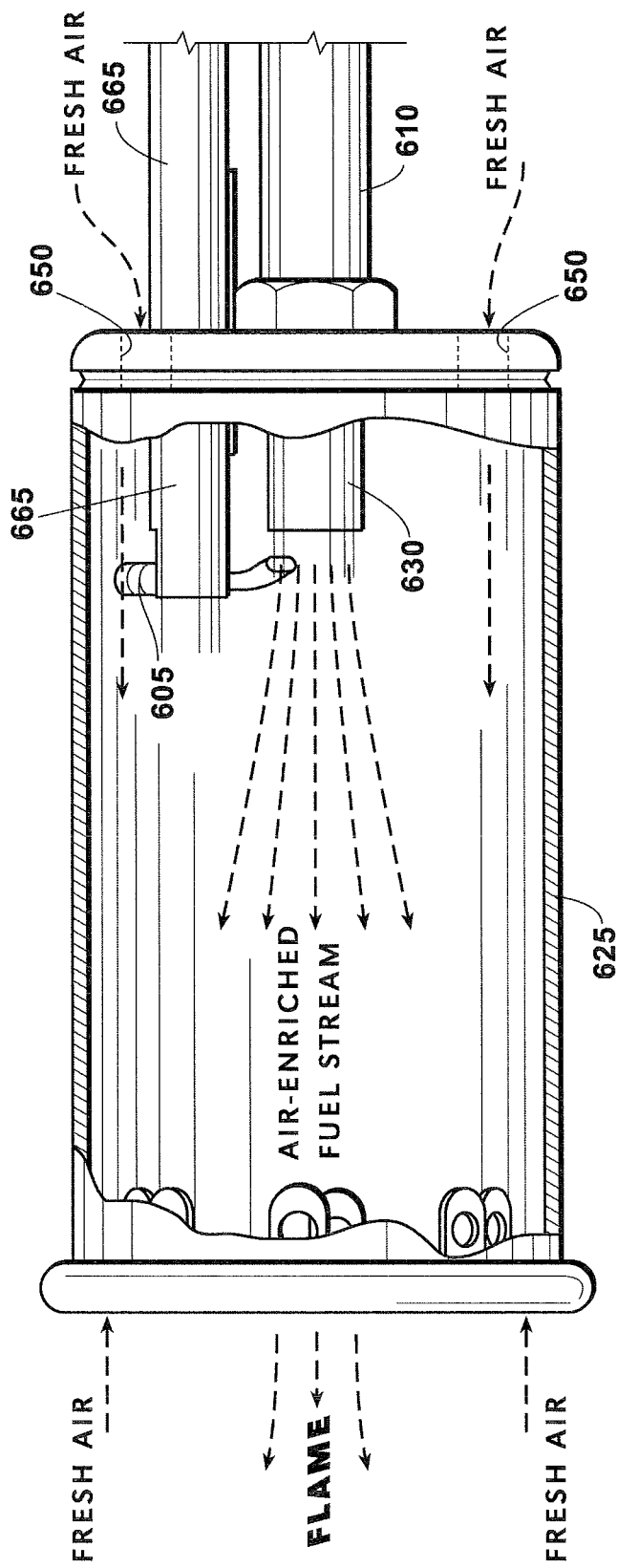
FIG. 7 contains a side view of the embodiment of FIG. 6.

According to still another embodiment, and as is generally set out in FIGS. 6 and 7, there is provided an embodiment which utilizes a fire bell reducer 660 that has an aperture 670 in its middle opposite the gas nozzle 630. As can be seen, the reducer 680 is designed to limit the flame that is emitted through the orifice 670. Unconstrained the flame from the torch might extend 24 to 30 inches beyond the end of the bell 625. However, with the reducer 680 in place the flame might only extend half that distance making it more suitable for applications which require a more focused approach, e.g., sous-vide cooking. The Continuing with the embodiment of FIGS. 6 and 7, in this variation a diverter 605 mounted on a rotatable post 665 is provided to assist in igniting the flame using igniter electrode 620 as has been explained previously. Additionally, gas is provided to the bell 625 via conduit 610 and released into it via nozzle 630. The bell 625 contains a number of orifices 650 to permit air to enter the combustion chamber. Further, in some embodiments the reducer 660 will include a number of air gaps 680 around its periphery to allow fresh air to be drawn into the bell during operation, thereby assisting in combustion and helping to sustain the eddy pool of burning gas.

In operation, inside the bell 625 gas from the nozzle 630 is emitted under pressure as is indicated. Some amount of the gas will fall outside the orifice 670 because of its size and be turned back toward the nozzle 630 or otherwise contribute to the turbulence inside of the bell 625 which, in turn, tends to reduce the force of the gas that is emitted through the aperture 670. Also, the air gaps 680 will permit fresh air to enter the combustion chamber inside of the bell 625 which will further assist the combustion of gas contained therein.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as if fully set out at this point.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A gas torch, comprising:
    (a) an ignition bell, said ignition bell having a closed end and an open end;
    (b) a gas conduit that passes into said ignition bell through said closed end and that terminates in a nozzle inside of said ignition bell, said gas conduit being positionable to be in fluid communication with a compressed source of gas, said nozzle for emitting a gas under pressure inside of said bell while in operation;
    (c) an igniter within said ignition bell, said igniter situated proximate to said nozzle but outside of a path of said emitted gas;
    (d) a solid diverter inside of said ignition bell and mounted on said closed end thereof, said diverter
        positionable to be placed in a path of gas emitted from said nozzle when the gas is being ignited by said igniter and block a portion of the gas that is emitted from said nozzle when so positioned, and
        positionable to be out of the path of the emitted gas after the gas has been ignited; and
    (e) a gas connector positionable to be in fluid communication with said gas conduit and with said compressed source of gas.

2. The gas torch according to claim 1, wherein said diverter is rotatable to be placed in a path of gas emitted from said nozzle when the gas is being ignited by said igniter, and rotatable to be out of the path of the emitted gas after the gas has been ignited.

3. The gas torch according to claim 2, wherein said diverter is in mechanical communication through said closed end of said ignition bell with a trigger mechanism remote from said ignition bell, said trigger mechanism at least for urging said diverter to rotate into the path of gas emitted from said nozzle when the gas is being ignited by the igniter.

4. The gas torch according to claim 2, further comprising:
(f) a gas shut off valve situated along said gas conduit, said gas shutoff valve operable to permit or restrict a flow of gas through said conduit when said conduit is placed in fluid communication with a source of gas.

5. The gas torch according to claim 1, further comprising:
(f) a fire bell reducer, said fire bell reducer comprising a plate with an aperture therethrough, wherein said plate is affixed to said ignition bell proximate to said open end and covers said open end of said ignition bell, wherein said aperture is smaller than open end of said ignition bell, thereby reducing an amount of gas escaping from said ignition bell when the torch is being operated.

6. The gas torch according to claim 5, wherein said fire bell reducer is affixed to said open end of said ignition bell at a plurality of space apart locations such that a plurality of openings between said fire bell reducer and an inner wall of said ignition bell.

7. The torch according to claim 4, wherein said gas connector and said gas shut off valve are connected by a handle tube, further comprising:
(g) a check valve assembly, said check valve assembly comprising:
 (i) a check valve tube situated within said handle tube, said check valve tube having a smaller diameter than said handle tube, said check valve tube having an upper end and a lower end, said upper end of said check valve tube having an aperture therethrough, said lower end of said check valve tube terminating in a tube flange situated outside of handle tube and within said gas connector, said tube flange having a larger diameter than an inner diameter of said handle tube, and
 (ii) a check valve ball situated within said check valve tube, said check valve ball having a diameter larger than said aperture at said upper end of said check valve tube, and said check valve ball having a weight sufficient to keep it away from said aperture at said upper end of said check valve unless said handle tube is tilted away from a vertical orientation.

8. The gas torch according to claim 1, wherein said ignitor is an electrode.

9. A gas torch, comprising:
(a) an ignition bell, said ignition bell having a closed end and an open end;
(b) a gas conduit that passes into said ignition bell through said closed end and that terminates in a nozzle inside of said ignition bell, said gas conduit being positionable to be in fluid communication with a compressed source of gas, said nozzle for emitting a gas under pressure inside of said bell while in operation;
(c) an igniter within said ignition bell, said igniter situated proximate to said nozzle but outside of a path of said emitted gas;
(d) a diverter inside of said ignition bell and mounted on said closed end thereof, said diverter
 rotatable to be placed in a path of gas emitted from said nozzle when the gas is being ignited by said igniter, and
 rotatable to be out of the path of the emitted gas after the gas has been ignited; and
(e) a trigger mechanism remote from said ignition bell and in mechanical communication through said closed end of said ignition bell with said diverter, said trigger mechanism at least for urging said diverter to rotate into the path of gas emitted from said nozzle when the gas is being ignited by the igniter.

* * * * *